(12) United States Patent
Aizawa

(10) Patent No.: US 7,882,387 B2
(45) Date of Patent: Feb. 1, 2011

(54) RECONFIGURABLE DEVICE AND CONTROL METHOD THEREOF

(75) Inventor: Eiji Aizawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 355 days.

(21) Appl. No.: 11/740,418

(22) Filed: Apr. 26, 2007

(65) Prior Publication Data

US 2007/0283060 A1 Dec. 6, 2007

(30) Foreign Application Priority Data

Apr. 26, 2006 (JP) .............................. 2006-122382

(51) Int. Cl.
*G06F 11/00* (2006.01)

(52) U.S. Cl. .............................. 714/3; 714/10; 708/531; 708/534

(58) Field of Classification Search ..................... 714/3, 714/10; 708/230–236, 531, 534
See application file for complete search history.

(56) References Cited

U.S. PATENT DOCUMENTS

| | | | | |
|---|---|---|---|---|
| 4,371,754 A | * | 2/1983 | De et al. ........................ 714/10 |
| 5,485,604 A | * | 1/1996 | Miyoshi et al. ................ 714/10 |
| 6,122,756 A | * | 9/2000 | Baxter et al. ................... 714/30 |
| 6,145,072 A | * | 11/2000 | Shams et al. ................... 712/22 |
| 6,496,918 B1 | * | 12/2002 | DeHon et al. .................. 712/15 |
| 6,496,940 B1 | * | 12/2002 | Horst et al. ..................... 714/4 |
| 6,795,909 B2 | * | 9/2004 | Barry et al. .................... 712/15 |
| 7,007,203 B2 | * | 2/2006 | Gorday et al. ................. 714/37 |
| 7,555,692 B1 | * | 6/2009 | Iacobovici .................... 714/746 |
| 2004/0025086 A1 | * | 2/2004 | Gorday et al. ................. 714/37 |
| 2006/0259749 A1 | * | 11/2006 | Veale et al. ................... 712/226 |

FOREIGN PATENT DOCUMENTS

JP 11-167556 A 6/1999

* cited by examiner

*Primary Examiner*—Robert Beausoliel
*Assistant Examiner*—Elmira Mehrmanesh
(74) *Attorney, Agent, or Firm*—Rossi, Kimms & McDowell LLP (57) ABSTRACT

A reconfigurable device having a plurality of component elements each configured in accordance with configuration information, the device being adapted to determine whether an error in configuration information for the component elements affects an output of the reconfigurable device.

9 Claims, 5 Drawing Sheets

| PEID | INPEID0 | INPEID1 | OUT |
|---|---|---|---|
| PE6 | PE4 | PE5 | PE5 |
| PE5 | PE2 | PE3 | PE2/3 |
| PE4 | PE0 | PE1 | PE0/1 |
| PE3 | IN6 | IN7 | IN6/7 |
| PE2 | IN4 | CONST | IN4 |
| PE1 | IN2 | IN3 | IN2/3 |
| PE0 | IN0 | IN1 | IN0/1 |

| PEID | OP | DIST |
|---|---|---|
| PE6 | MUX | OUT |
| PE5 | MUX | PE6 |
| PE4 | MUX | PE6 |
| PE3 | ADD | PE5 |
| PE2 | ADD | PE5 |
| PE1 | ADD | PE4 |
| PE0 | ADD | PE4 |

FIG. 5

| PEID | INPEID0 | INPEID1 | OUT |
|---|---|---|---|
| PE6 | PE4 | PE5 | PE5 |
| PE5 | PE2 | PE3 | PE2/3 |
| PE4 | PE0 | PE1 | PE0/1 |
| PE3 | IN6 | IN7 | IN6/7 |
| PE2 | IN4 | CONST | IN4 |
| PE1 | IN2 | IN3 | IN2/3 |
| PE0 | IN0 | IN1 | IN0/1 |

RECONFIGURABLE DEVICE AND CONTROL METHOD THEREOF

BACKGROUND OF THE INVENTION

1. Field of the Invention

The present invention relates to a dynamic reconfigurable device and a control method thereof.

2. Description of the Related Art

In recent years, shortening a design period of the LSI (Large Scale Integration) has increasingly been demanded, and as one solution for shortening the LSI design period, attention has been paid to dynamic reconfigurable devices (see, for example, Japanese Laid-Open Patent Publication No. H11-167556).

A dynamic reconfigurable device is comprised of an LSI into which a plurality of processing units (processing elements) each having a computing unit (ALU) are incorporated. With the dynamic reconfigurable device, even when the device is in operation, ALU control in each processing element and connections between the processing elements can be switched dynamically (during LSI operation).

Since being configured such that the circuit change is made in units of processing element (PE), the dynamic reconfigurable device requires less configuration information for making the circuit change and circuits for use for a device configuration change, which are simple in construction. This makes it possible to change the configuration information at high speed.

Furthermore, the dynamic reconfigurable device can be made compatible to a plurality of applications by dynamically switch circuits within the device during the execution of any application. As a typical dynamic reconfigurable device, there have been known DAPDNA manufactured by IP Flex Inc. and DRP manufactured at NEC Corporation both of which include several hundred processing elements and have high processing ability.

However, processing must be discontinued in a case where an error is generated in configuration information (context) when the dynamic reconfigurable device is in operation after LSI fabrication.

SUMMARY OF THE INVENTION

An object of the present invention is to improve the reliability of a reconfigurable device.

Another object of the present invention is to provide a reconfigurable device adapted to continue execution of processing even in a case where a context error (configuration information error) takes place so long as the generated context error does not affect processing results.

A further object of the present invention is to provide a reconfigurable device having a plurality of component elements each adapted to be configured in accordance with configuration information and a judgment device adapted to determine whether an error in the configuration information for the plurality of component elements affects an output of the reconfigurable device.

A still further object of the present invention is to provide a control method of a reconfigurable device having a plurality of component elements each adapted to be configured in accordance with configuration information, the method comprising the steps of detecting an error in the configuration information for the plurality of component elements, and determining whether the error in the configuration information for the plurality of component elements affects an output of the reconfigurable device.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
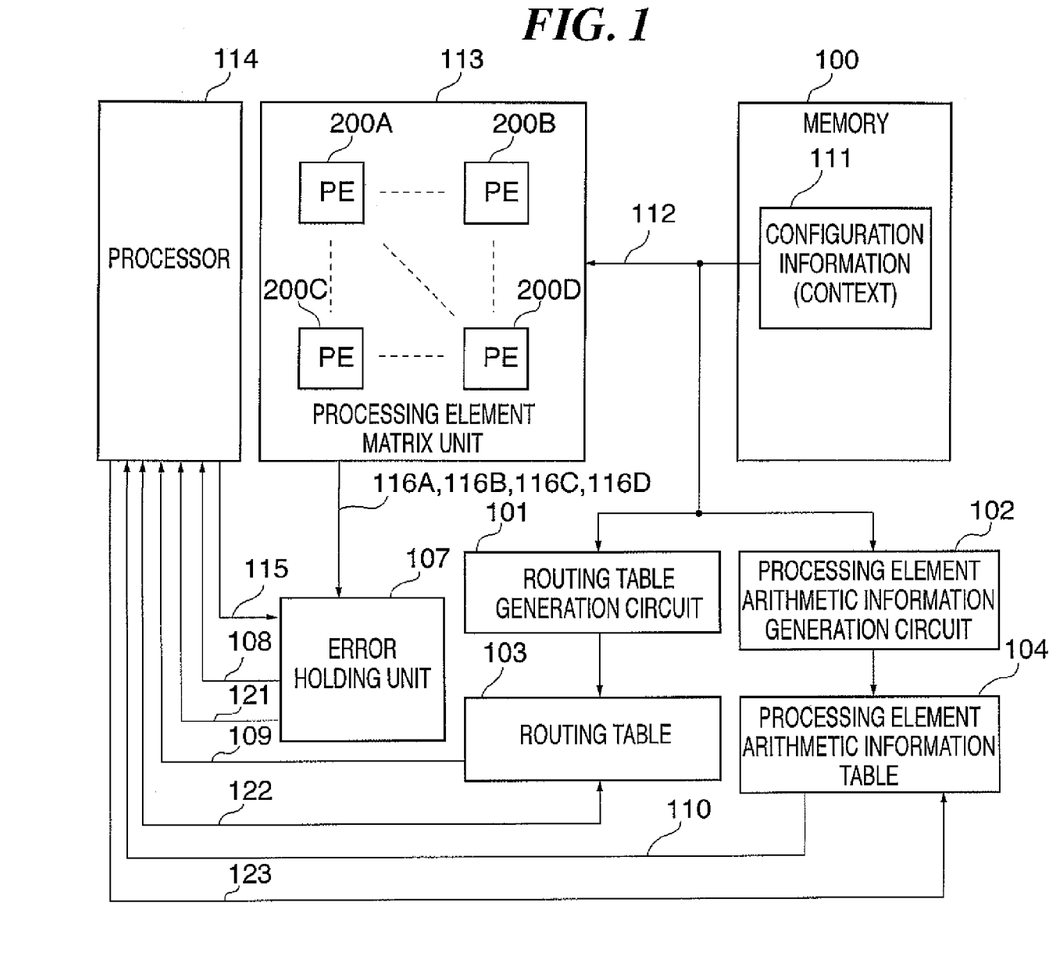
FIG. 1 is a block diagram schematically showing the construction of a control apparatus according to one embodiment of the present invention, together with a dynamic reconfigurable device controlled by the control apparatus.

FIG. 1 is a block diagram schematically showing the construction of a reconfigurable device control apparatus according to one embodiment of the present invention.

Referring to FIG. 1, reference numeral 100 denotes a memory adapted to store configuration information (context) 111 of a dynamic reconfigurable device. The memory 100 and a processing element matrix unit 113 cooperate to form essential part of the dynamic reconfigurable device. The context 111 stored in the memory 100 is loaded into the processing element matrix unit 113 using a signal 112.

Figure 2:
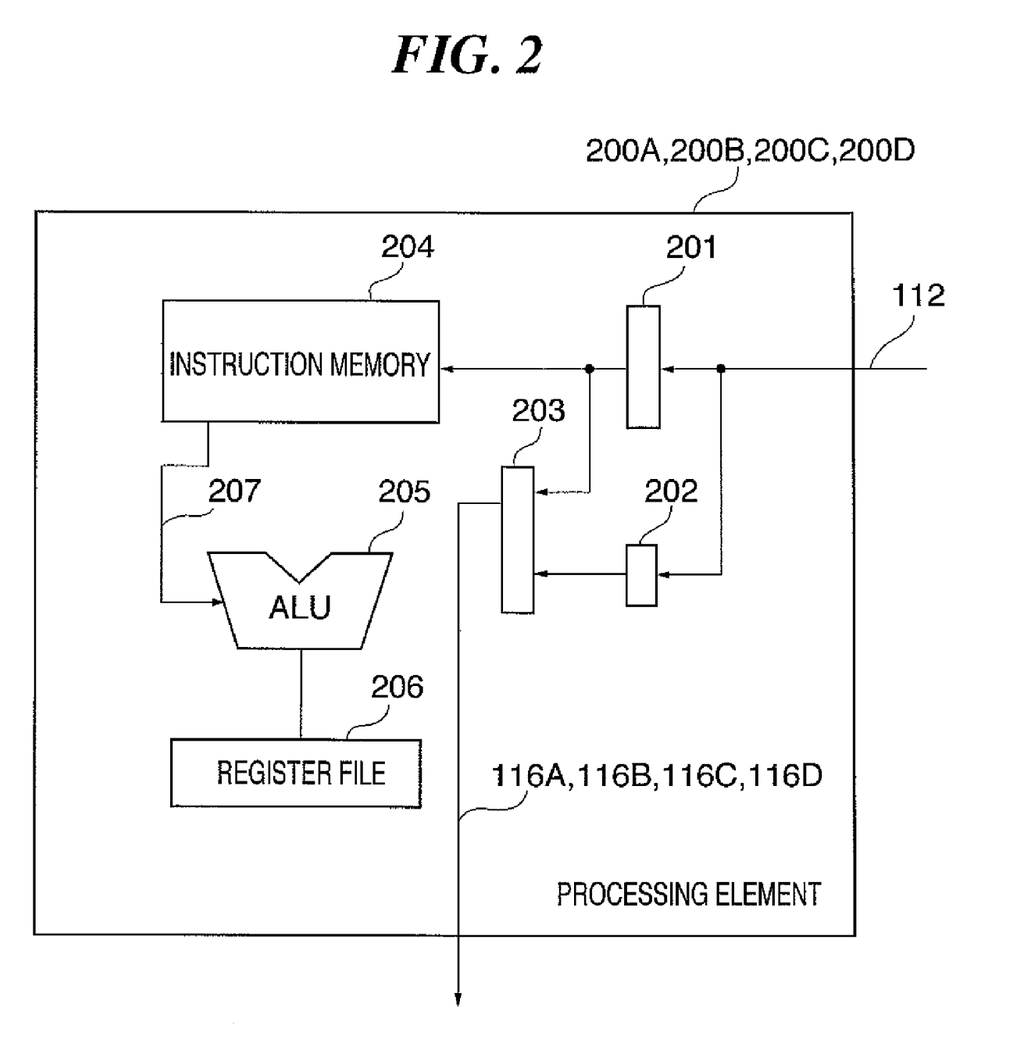
FIG. 2 is a schematic construction view of a processing element shown in FIG. 1.

The processing element matrix unit 113 includes a plurality of processing elements (PEs) 200A to 200D disposed therein in a two-dimensional array, and each of the processing elements 200A to 200D includes at least one computing unit such as for example an ALU (arithmetic and logic unit) (refer to FIG. 2). The construction of the computing unit in each processing element 200 and connections between the processing elements 200 can dynamically be changed by changing the context 111. In other words, in accordance with the context 111, the processing element matrix unit 113 has the construction thereof changeable to an arithmetic unit, a logic unit, a comparator circuit, a shift circuit, a mask circuit, a selector (MUX), or the like.

Reference numeral 101 denotes a routing table generation circuit, which is adapted to extract information on connections between the processing elements from the context 111 when the context 111 is loaded from the memory 100 to the processing element matrix unit 113. Reference numeral 103 denotes a routing table, which is adapted to hold the information on the connections between the processing elements extracted (acquired) by the routing table generation circuit 101.

Reference numeral 102 denotes a processing element arithmetic information table generation circuit. When the context 111 is loaded from the memory 100 into the processing element matrix unit 113, the processing element arithmetic information table generation circuit 102 is adapted to extract from the context 111 arithmetic information that indicates types of operations performed in respective ones of the processing elements 200A to 200D (contents of computation performed by respective ones of the processing elements 200A to 200D). Reference numeral 104 denotes a processing element arithmetic information table, which is adapted to hold arithmetic information on respective ones of the processing elements 200A to 200D extracted (acquired) by the processing element arithmetic information table generation circuit 102.

Reference numeral 114 denotes a processor. In a case where a context error takes place in any of the processing elements 200, the processor 114 determines whether or not output data from the processing element matrix unit 113 can be affected by the context error. This determination is performed based on the error holding unit 107, the routing table 103, and the processing element arithmetic information table 104.

Reference numerals 116A to 116D denote signals outputted from the processing elements 200A to 200D of the processing element matrix unit 113. Reference numeral 115 denotes an interrupt mask signal outputted from the processor 114. Reference numeral 108 denotes an interrupt signal outputted from the error holding unit 107 to the processor 114. Reference numeral 121 denotes a signal read out from the error holding unit 107 by the processor 114.

Reference numeral 122 denotes a signal representing a processing element ID (PEID) and outputted from the processor 114 to the routing table 103. The PEID is a unique ID assigned to a corresponding one of the processing elements 200A to 200O. Reference numeral 109 denotes a signal outputted from the routing table 103 according to the PEID outputted from the processor 114, the signal 109 being a routing information signal acquired from the table 103.

Reference numeral 123 denotes a signal outputted from the processor 114 to the processing element arithmetic information table 104, and the signal 123 indicates a corresponding one of the PEIDs. Reference numeral 110 denotes a signal outputted from the processing element arithmetic information table 104 according to the PEID outputted from the processor 114, and the signal 110 indicates arithmetic information acquired from the table 104.

FIG. 2 is a view schematically showing the construction of the processing elements 200A to 200D which are the same in construction.

Referring to FIG. 2, reference numeral 201 denotes an instruction pointer register adapted to hold an instruction pointer in the context 111 that corresponds to the context signal 112 received by the processing element 200 from the memory 100. Reference numeral 202 denotes a parity generation circuit adapted to generate, when receiving the signal 112, parity information corresponding to the instruction pointer. Reference numeral 203 denotes a parity check circuit adapted to make a parity check based on the context 111 and the generated parity information, thereby checking for a context error.

The aforementioned context error signals 116A to 116D, indicating results of parity error check, are transmitted from respective ones of the processing elements 200A to 200D to the error holding unit 107 in FIG. 1. Reference numeral 204 denotes an instruction memory adapted to store various instructions therein and output to an ALU 205 an instruction that corresponds to the address of an instruction pointer supplied from the instruction pointer register 201, as a signal 207. In accordance with the signal 207 from the instruction memory 204, the ALU 205 changes its processing function. Reference numeral 206 denotes a register file adapted to store results of processing implemented by the ALU 205.

Figure 3:
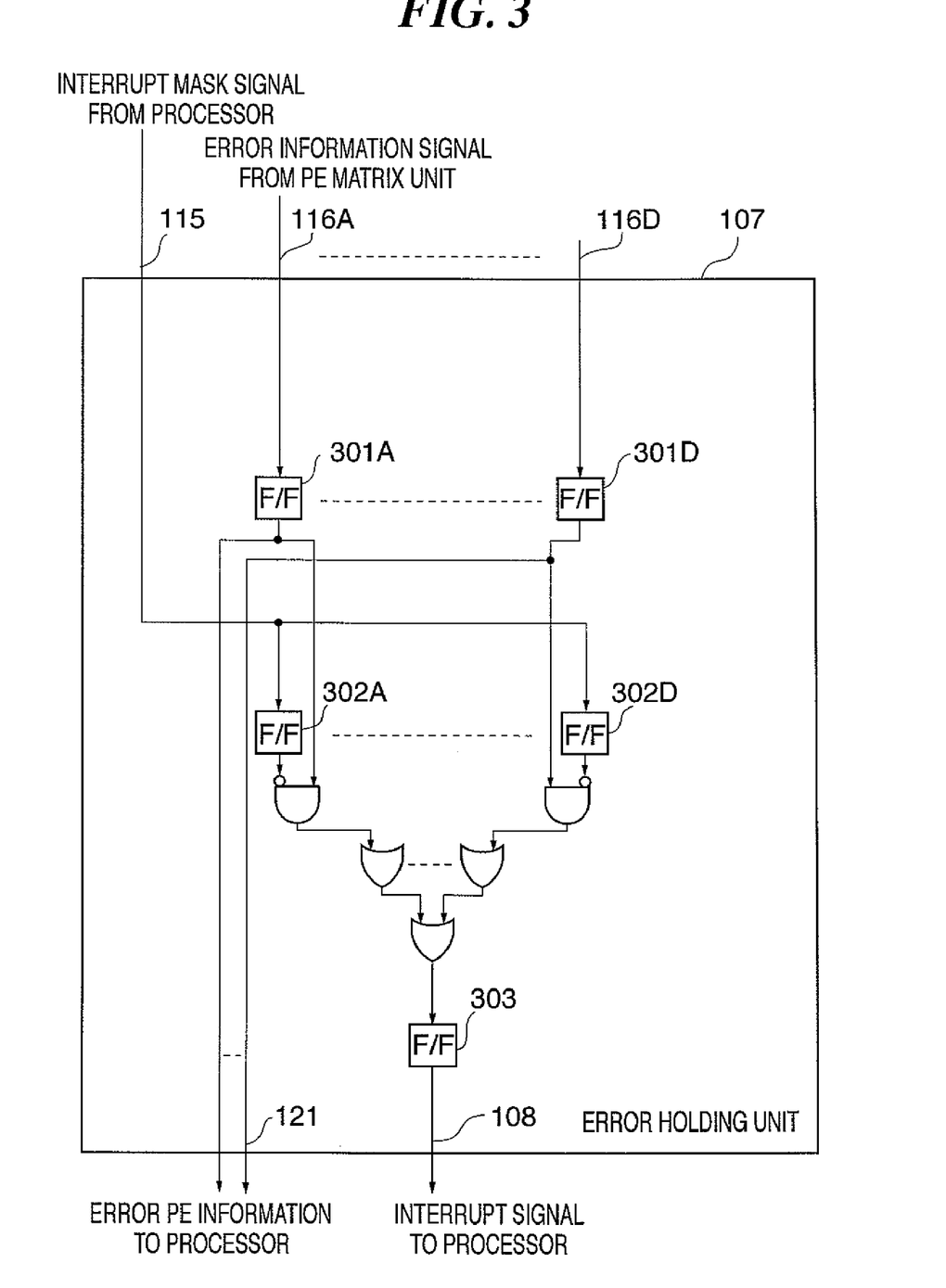
FIG. 3 is a schematic construction view of an error holding unit shown in FIG. 1.

FIG. 3 is a view schematically showing the construction of the error holding unit 107 shown in FIG. 1.

Referring to FIG. 3, reference numerals 301A to 301D denote a plurality of registers (FLIPs/FLOPs) provided in the error holding unit 107. The registers 301A to 301D are each adapted to be set with a value of a parity error check result signal (error information) 116 outputted from a corresponding one of the PEs 200 in the processing element matrix unit 113.

Reference numerals 302A to 302D denote a plurality of registers (FLIPs/FLOPs) provided in the error holding unit 107. Each of the registers 302A to 302D is adapted to be set with an interrupt mask signal 115 outputted from the processor 114.

Reference numeral 303 denotes a register (FLIP/FLOP). The register 303 is adapted to be set with a signal obtained as a logical sum (OR) of all of logical products (AND) of register values in the registers 301A to 301D and inversions of register values of corresponding registers 302. The register 303 is adapted to selectively output an interrupt signal 108 to the processor 114 in accordance with the register value thereof.

Each of the signals 121 (error PE information) indicates the register value (error PE information) in a corresponding one of the registers 301A to 3010. Any of the processing elements 200 in which a context error takes place can be identified by the processor 114 by reading out the signals 121 from all the registers 301A to 301D of the error holding unit 107.

Figure 4:
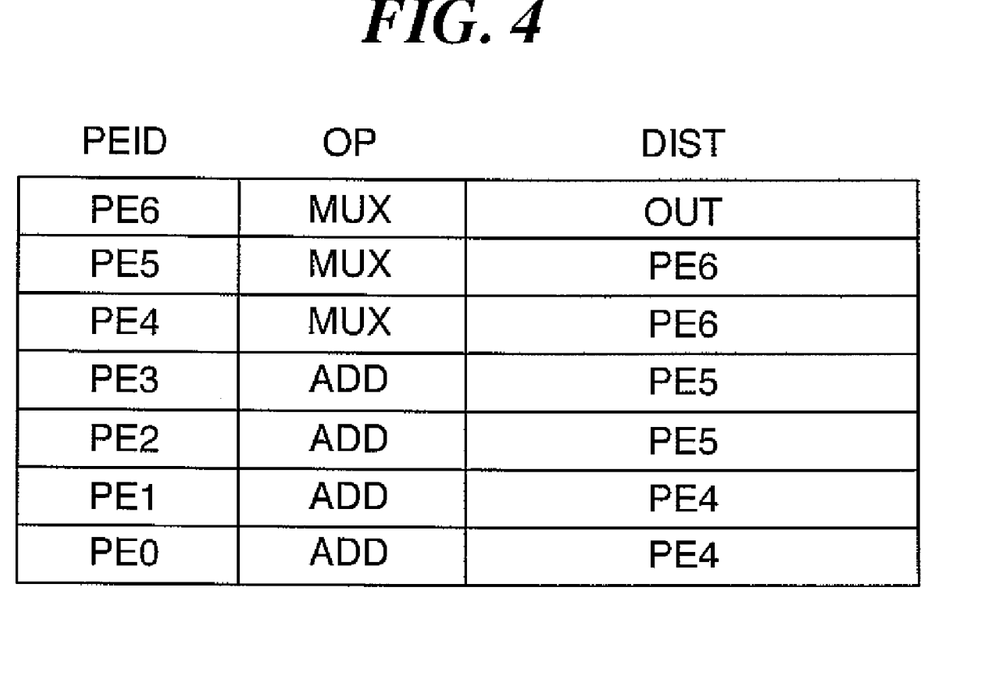
FIG. 4 is a schematic view showing an example of a routing table shown in FIG. 1.

FIG. 4 is a schematic view showing an example of the routing table 103 shown in FIG. 1.

Referring to FIG. 4, the routing table 103 holds connection information on connections between a plurality of processing elements. The connection information includes information indicating IDs of the processing elements (PEID) information indicating types of computing units by which the processing elements are formed, i.e., information indicating contents of computation (OP) in these processing elements, and information indicating destinations (DIST) to which results of processing implemented in the processing elements are outputted. A symbol "MUX" shown in FIG. 4 represents a selector, and a symbol "ADD" represents an adder. In the present example, the information DIST representative of the designations are IDs of destination processing elements. Connection information on each processing element can be acquired by identifying a line in the routing table 103 using as a key the ID of that processing element and by confirming a destination processing element ID given in the identified line.

Figure 5:
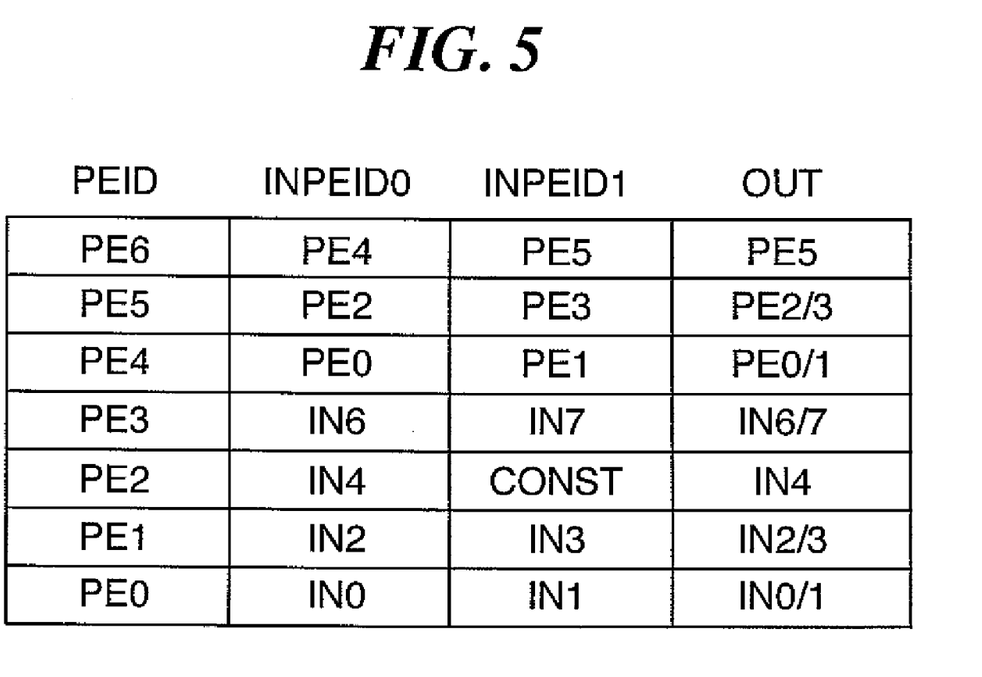
FIG. 5 is a schematic view showing an example of a processing element arithmetic information table shown in FIG. 1.

FIG. 5 is a schematic view showing an example of the processing element arithmetic information table 104 shown in FIG. 1.

Referring to FIG. 5, the processing element arithmetic information table 104 holds arithmetic information indicating contents of computation implemented in processing elements. The arithmetic information of each processing element is comprised of an ID of that processing element (PEID), first and second data input source IDs (INPEID0 and INPEID1), such as first and second input processing element IDs, relating to that processing element, and information (OUT) indicating one or more data input sources affecting on output data from that processing element. Thus, the arithmetic information in the processing element arithmetic information table 104 is typically comprised of two input processing element IDs and one output data-related processing element ID for each of the processing elements, thereby indicating input/output information for the processing elements 200 corresponding to respective ones of the PEIDs. The two input processing element IDs indicate two processing elements connected to an input side of the processing element 200 concerned.

Symbols "IN7, IN6, and IN4 to IN0" in FIG. 5 represent respective ones of input port numbers of the processing element matrix unit 113. An external signal is directly inputted to a processing element whose input side is connected to any of input ports (not shown) represented by respective ones of the input port numbers. Symbol "CONST" given to the INPEID1 of the processing element whose PEID is PE2 indicates that a constant value is inputted to a second input of that processing element. Symbol "IN6/7" given to the OUT of the processing element whose PEID is PE3 indicates that both values of IN6 and IN7 affect output data from that processing element.

Information given to each input processing element ID (INPEID0 or INPEID2) is a PEID (any of PE0 to PE6 in this case) or an input port number (any of IN0 to IN7 in this case) of the processing element matrix unit 113 in FIG. 1 or a constant value (CONST ). The output data related-information (OUT) indicates a data input source that affects output data from the processing element concerned. In a case where two data input sources affect the output result of the processing element, both the numbers of these data input sources are shown with a slash "/" therebetween. For example, the processing element whose PEID is PE0 acquires data from the input ports IN0, IN1 and performs an arithmetic addition (ADD). In this case, in order to indicate that input data from both the IN0 and the IN1 affect results of computation implemented in the processing element, an indication "IN0/1" is given to the output data-related information OUT corresponding to the PE0, as shown in FIG. 5.

Figure 6:
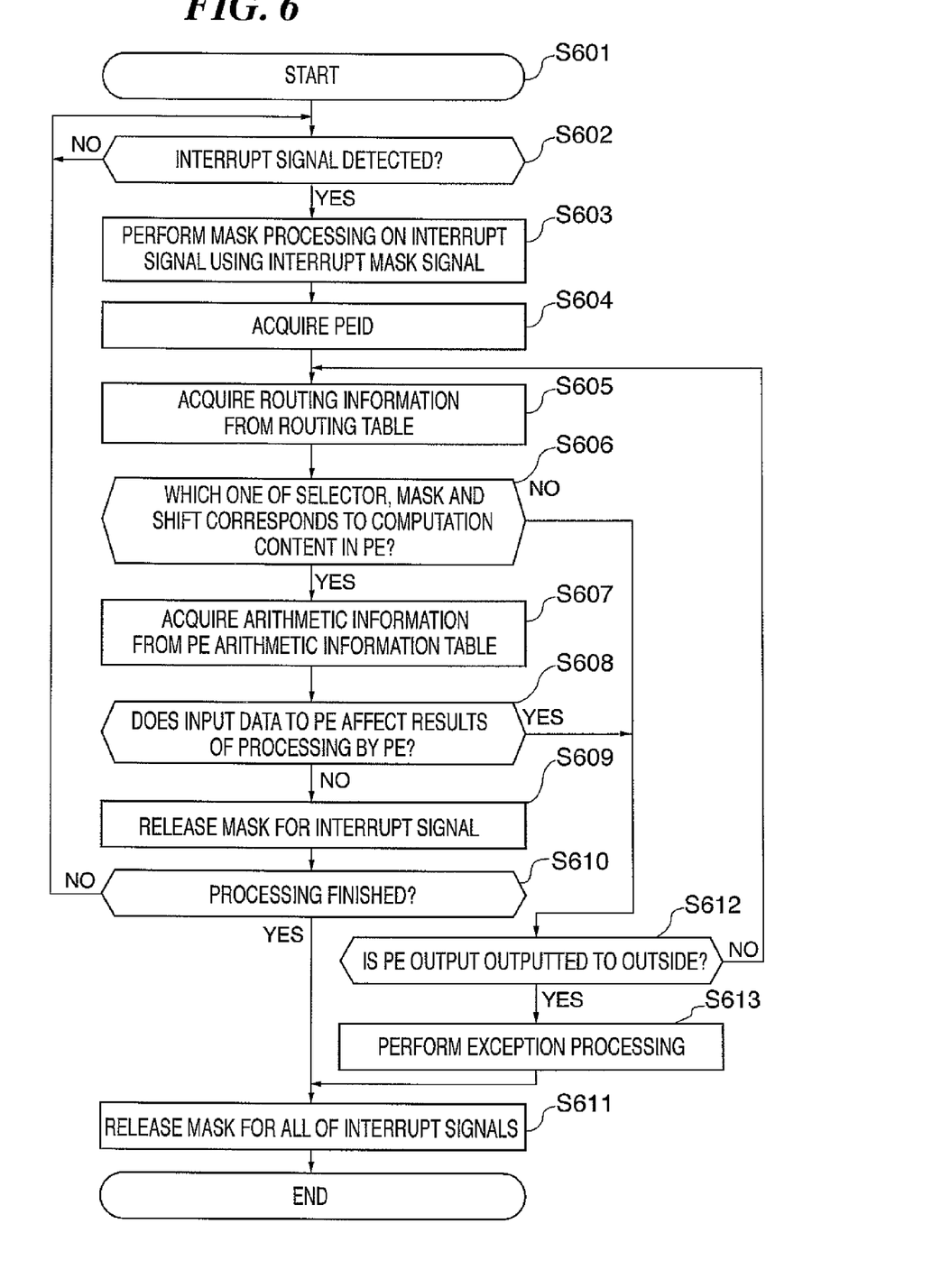
FIG. 6 is a flowchart of a control process executed by a processor when a context error is generated.

FIG. 6 is a flowchart showing a control process executed by the processor 114 when a context error takes place. This process is a context error processing for determining whether or not the generated context error affects an output from the dynamic reconfigurable device. The flowchart shown in FIG. 6 represents a program that is executed by the processor 114, which is a computer. This program is stored in a memory (not shown) in the processor 114. The processor 114 reads out this program from the memory and executes the same.

Referring to FIG. 6, in a step S601, the processor 114 starts the context error processing. The processor 114 starts this process each time a context 111 is loaded from the memory 100 (step S601).

In a step S602, the processor 114 determines whether or not an interrupt signal 108 from the error holding unit 107 has been detected, i.e., determines whether or not a context error has been detected. More specifically, when a context error is generated in any of the processing elements 200 of the processing element matrix unit 113, error information is outputted from the processing element matrix unit 113 using a corresponding one of signals 116A to 116D. The error information is caused to be set into a corresponding one of the registers 301A to 301D of the error holding unit 107. Then, an interrupt signal 108 is outputted from the error holding unit 107 to the processor 114, whereby the processor 114 is notified of generation of the context error. If it is determined at the step S602 that no context error has been detected (No to the step S602), the flow returns to the step S602. Thus, the following process is not started until any context error is generated.

On the other hand, if it is determined in the step S602 that a context error has been detected (YES to the step S602), the processor 114 performs mask processing on an interrupt signal generated upon generation of the context error, using an interrupt mask signal 115 (step S603). Next, in a step S604, a processing element 200 is identified in which the context error has been generated. In this case, the processor 114 reads out signals 121 from all the registers 301 of the error holding unit 107 to thereby acquire the ID (PEID) of the processing element 200 in which the context error has been generated.

In a step S605, routing information is acquired from the routing table 103 (FIG. 4) using the PEID acquired in the step S604. In this case, the processor 114 outputs the acquired PEID, as a signal 122, to the routing table 103 to thereby acquire the routing information, as a signal 109, from the routing table 103.

Next, in a step S606, it is determined as to which one of selector (MUX), mask, and shift corresponds to the content of computation implemented by the processing element indicated in the acquired routing information, i.e., it is determined whether the input data inputted to that processing element is arithmetic information that can affect an output from the processing element. If the content of computation corresponds to any of selector, mask, and shift (YES to the step S606), the flow proceeds to a step S607. On the other hand, if the content of computation does not correspond to any of selector, mask, and shift (NO to the step S606), the flow proceeds to a step S612.

In the step S607, arithmetic information is acquired from the processing element arithmetic information table 104 (FIG. 5). In this case, the processor 114 outputs, as a signal 123, the PEID to the processing element arithmetic information table 104, and acquires arithmetic information corresponding to the PEID from the processing element arithmetic information table 104, using a signal 110.

Next, in a step S608, it is determined from the arithmetic information acquired in the step S607 whether or not the input data inputted to the processing element in which a context error has been generated affects results of processing performed by the processing element. If it is determined that the input data affects the processing result (YES to the step S608), the flow proceeds to the step S612. On the other hand, if it is determined that the input data does not affect the processing result (NO to the step S608), the flow proceeds to a step S609.

In the step S609, the mask for the interrupt signal subjected to the mask processing in the step S603 is released. In this case, using an interrupt mask signal 115, the processor 114 releases the mask for interrupt signals for the processing elements other than the processing element in which the context error has been generated.

Next, in a step S610, it is determined whether or not all the processing to be implemented by the processing element matrix unit 113 with the present configuration has been finished. If it is determined that all the processing has been finished, processing in a step S611 is performed. On the other hand, if it is determined that all the processing by the processing element matrix unit 113 has not been finished as yet, the processing in the step S602 and in the subsequent step is executed again.

In the step S611, the mask for all the interrupt signals is released. Using the interrupt mask signal 115 shown in FIG. 1, the processor 114 releases the mask for all the interrupt signals, whereupon the process is continued.

In the step S612, it is determined whether or not a DIST (destination to which a result of processing implemented by a processing element is outputted) indicated in the routing information acquired in the step S605 is outside (OUT), i.e., whether or not the result of the processing by the processing element is outputted to the outside. To this end, based on the routing information acquired from the routing table 103 in the step S605, the processor 114 determines whether or not the processing result is outputted to the outside. If it is determined that the processing result is not outputted to the outside (NO to the step S612), the processing in the step S605 and in the subsequent steps is executed again using a value of the DIST in the routing information (PEID) as the next retrieval key.

On the other hand, if the processing result is outputted to the outside (YES to the step S612), exception processing is carried out (step S613) to notify the outside that a fatal context error has occurred, whereupon the flow proceeds to the step S611.

Next, with reference to connection information in the routing table 103 in FIG. 4 and arithmetic information in the processing element arithmetic information table 104 in FIG. 5, an explanation will be given of the control process performed by the processor 114 when a context error is generated in the processing element whose PEID is PE0 (hereinafter referred to as the processing element ID0).

In a case where a context error is generated in the processing element ID0, the parity check circuit 203 detects the context error and outputs a parity error check result signal (error information) using a signal 116. The error information is caused to be set in a corresponding one of the registers 301 in the error holding unit 107, and the generation of context error is notified to the processor 114 by an interrupt signal 108 from the error holding unit 107.

After receiving the interrupt signal 108, the processor 114 outputs an interrupt mask signal 115 to the error holding unit 107. Then, after interrupt mask processing being implemented, the processor 114 reads out signals 121 from all the registers 301 of the error holding unit 107 to thereby acquire a PEID (=PE0) (hereinafter referred to as the PEID0) that indicates that the context error has been generated in the processing element ID0.

By outputting the acquired PEID0 to the routing table 103 using a signal 122, the processor 114 acquires connection information (routing information) associated with the processing element ID0 from the routing table 103. As shown in FIG. 4, the routing information acquired based on the PEID0 indicates that the content of computation OP in the processing element is the ADD and the designation DIST is the PE4 to which the result of the processing implemented by the processing element is outputted. In this case, since the OP does not correspond to any of selector (MUX), mask, and shift, the processor 114 outputs the PEID (=PE4) (hereinafter referred to as the PEID4) to the routing table 103 and acquires the next routing information, using a signal 122 and using the DIST (PE4) given in the routing information as the next retrieval key.

As shown in FIG. 4, the routing information acquired based on the PEID4 indicates that the OP corresponds to the MUX and the DIST is the PE6. In this case, since the OP represents the selector (MUX), the processor 114 outputs, using a signal 123, the PEID4 to the processing element arithmetic information table 104 and acquires the arithmetic information associated with the processing element. As shown in FIG. 5, the arithmetic information acquired based on the PEID 4 indicates that there is a possibility that both the INPEID0 and the INPEID1 (PE0 and PE1) affect the output from the processing element of PEID4. In other words, it is understood that the error generated in the processing element of PE0 can be propagated to the output of the PE4. In this case, the answer to the step S608 becomes YES, whereas the answer to the step S612 becomes NO.

In this case, using a value of the DIST of the routing information as the next retrieval key and using a signal 122, the processor 114 outputs the PEID 6 to the routing table 103 and acquires the next routing information. As shown in FIG. 4, the routing information acquired based on the PEID6 indicates that a value of the OP represents the MUX and a value of the DIST represents the OUT. Since the value of the OP represents the selector (MUX), the processor 114 outputs, using a signal 123, the PEID 6 to the processing element arithmetic information table 104, thereby acquiring the arithmetic information relating to the processing element.

As shown in FIG. 5, the arithmetic information acquired based on the PEID6 indicates that the input from the processing element of PE5 out of the INPEID0 and INPEID1 (=PE4, PE5) affects the output of the processing element of PE6. On the other hand, it is understood that an error generated in the processing element of PE4 is not propagated to the processing element of PE6. Thus, the processor 114 can continue execution of processing after the context error generation. In this case, the answer to the step S608 becomes NO.

On the other hand, in a case where the arithmetic information acquired by the processor 114 is set such that an error in the processing element of PE4 is propagated to the output of the processing element of PE6, the DIST in the routing information acquired based on the PE6 is the OUT and therefore the context error is outputted to the outside. Thus, it is necessary for the processor 114 to notify to the outside that a fatal error has been generated. In this case, the answer to the step S608 becomes YES and the answer to the step S612 becomes YES.

By performing the aforementioned processing, it is possible for the dynamic reconfigurable device to continue the execution of processing even when a context error is generated during the execution of processing as long as the generated context error does not affect a processing result, whereby the operating time of the device can be prolonged and the reliability can be improved.

It is to be understood that the present invention may also be accomplished by supplying a system or an apparatus with a storage medium in which a program code of software is stored that realizes the functions of the above described embodiment. In that case, a computer (or CPU or MPU) of the system or apparatus reads out and executes the program code stored in the storage medium. The program code itself read from the storage medium realizes the functions of the embodiment, and therefore, the program code and the storage medium in which the program code is stored constitute the present invention.

As the storage medium for supplying the program code, there may be used, for example, a Floppy® disk, a hard disk, an optical magnetic disk, or the like. An optical disk such as a CD-ROM, a CD-R, a CD-RW, a DVD-ROM, a DVD-R, a DVD+R, a DVD-RAM, a DVD-RW, or a DVD+RW, a magnetic tape, a nonvolatile memory card, or a RON may also be used. Alternatively, the program code may be downloaded via a network.

Further, it is to be understood that the way to achieve the functions of the above described embodiment is not limited to executing the program code read out by a computer. These functions may also be achieved by causing an OS (operating system) or the like which operates on the computer to perform a part or all of the actual operations based on instructions of the program code.

Further, it is to be understood that the functions of the embodiment may be accomplished by writing a program code read out from the storage medium into a memory provided on an expansion board inserted into a computer or a memory provided in an expansion unit connected to the computer. In that case, a CPU or the like provided in the expansion board or the expansion unit may be caused to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-122382, filed Apr. 26, 2006, which is hereby incorporated by reference herein in its entirety.

What is claimed is:

1. A reconfigurable device comprising:
    a plurality of component processing elements each reconfigurably constructed to perform a function in accordance with configuration information;
    a generating device adapted to generate an interrupt signal when an error happens in one of the plurality of component processing elements; and
    a processor, external to the plurality of component processing elements, adapted to detect the interrupt signal, to mask the interrupt signal when the interrupt signal is detected, and to make a judgment as to whether the error affects an output of the reconfigurable device based on the configuration information of said plurality of component processing elements,
    wherein some of the component processing elements are adapted to perform functions different from other of the component processing elements, and
    wherein a change of the configuration information causes a change in function performed by the reconfigurable device;
    wherein said processor is adapted to determine whether an output of a second component processing element that is a destination to which is outputted an output of a first component processing element in which the error has been generated is affected by the output of the first component processing element and whether the output of the second component processing element is outputted to an outside of the reconfigurable device, and
    wherein in a case where it is determined that the output of the second component processing element is affected by the output of the first component processing element and is not outputted to the outside of the reconfigurable device, said processor is adapted to determine whether an output of a third component processing element that is a designation to which is outputted the output of the second component processing element is affected by the output of the second component processing element and is outputted to the outside of the reconfigurable device.

2. The device according to claim 1, wherein each of said plurality of component processing elements is adapted to make an error check on context information that is received thereby.

3. The device according to claim 1, wherein said processor is adapted to determine whether the error in the configuration information for a given component processing element affects the output of the reconfigurable device based on a relationship of connection between the plurality of component processing elements.

4. The device according to claim 1, wherein processor is adapted to determine whether an error in the configuration information for a given component processing element affects the output of the reconfigurable device based on types of computation performed by the plurality of component processing elements.

5. A control method of a reconfigurable device having a plurality of component processing elements each reconfigurably constructed to perform a function in accordance with configuration information, and a processor external to the plurality of component processing elements, comprising:
    a generating step of generating an interrupt signal when an error happens in one of the plurality of processing elements;
    a detecting step, performed by the processor, of detecting the interrupt signal;
    a masking step, performed by the processor, of masking the interrupt signal when the interrupt signal is detected by the detecting step;
    a determining step, performed by the processor, of determining whether the error affects an output of the reconfigurable device based on the configuration information of the plurality of component processing elements,
    wherein some of the component processing elements perform functions different from other of the component processing elements, and
    wherein a change of the configuration information causes a change in function performed by the reconfigurable device;
    wherein said determining step determines whether an output of a second component processing element that is a destination to which is outputted an output of a first component processing element in which the error has been generated is affected by the output of the first component processing element and whether the output of the second component processing element is outputted to an outside of the reconfigurable device, and
    wherein in a case where it is determined that the output of the second component processing element is affected by the output of the first component processing element and is not outputted to the outside of the reconfigurable device, said determining step determines whether an output of a third component processing element that is a designation to which is outputted the output of the second component processing element is affected by the output of the second component processing element and is outputted to the outside of the reconfigurable device.

6. The method according to claim 5, wherein in said detecting step, each of the plurality of component processing elements makes an error check on context information that is received thereby.

7. The method according to claim 5, wherein in said determining step, a determination is made as to whether an error in the configuration information for a given component processing element affects the output of the reconfigurable device based on a relationship of connection between the plurality of component processing elements.

8. The method according to claim 5, wherein in said determining step a determination is made as to whether an error in the configuration information for a given component processing element affects the output of the reconfigurable device based on types of computation performed by the plurality of component processing elements.

9. A reconfigurable device comprising:
    a plurality of component processing elements each reconfigurably constructed to perform a function in accordance with configuration information;
    a generating device adapted to generate an interrupt signal when an error happens in one of the plurality of component processing elements; and
    a processor adapted to detect the interrupt signal, to mask the interrupt signal when the interrupt signal is detected, and to make a judgment as to whether the error affects an output of the reconfigurable device based on the configuration information of said plurality of component processing elements, wherein some of the component processing elements are adapted to perform functions different from other of the component processing elements, wherein a change of the configuration information causes a change in function performed by the reconfigurable device, wherein said processor is adapted to determine whether an output of a second component processing element that is a destination to which is outputted an output of a first component processing element in which the error has been generated is affected by the output of the first component processing element and whether the output of the second component processing element is outputted to an outside of the reconfigurable device, and wherein in a case where it is determined that the output of the second component processing element is affected by the output of the first component processing element and is not outputted to the outside of the reconfigurable device, said processor is adapted to determine whether an output of a third component processing element that is a designation to which is outputted the output of the second component processing element is affected by the output of the second component processing element and is outputted to the outside of the reconfigurable device.

* * * * *